United States Patent
Anzai

(10) Patent No.: US 8,899,806 B2
(45) Date of Patent: Dec. 2, 2014

(54) VEHICLE LIGHT

(71) Applicant: Stanley Electric Co., Ltd., Tokyo (JP)

(72) Inventor: Toshimichi Anzai, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/685,680

(22) Filed: Nov. 26, 2012

(65) Prior Publication Data

US 2013/0135885 A1     May 30, 2013

(30) Foreign Application Priority Data

Nov. 24, 2011    (JP) ................................ 2011-256248

(51) Int. Cl.
    *F21S 8/10*          (2006.01)
    *F21V 9/00*          (2006.01)

(52) U.S. Cl.
    USPC ........... 362/545; 362/459; 362/543; 362/544; 362/511; 362/509

(58) Field of Classification Search
None
See application file for complete search history.

(56) References Cited

U.S. PATENT DOCUMENTS

| | | | | |
|---|---|---|---|---|
| 6,527,411 B1* | 3/2003 | Sayers | .......................... | 362/245 |
| 7,316,495 B2* | 1/2008 | Watanabe et al. | ............. | 362/545 |
| 7,824,086 B2* | 11/2010 | Yamamura et al. | ........... | 362/519 |
| 2005/0122735 A1* | 6/2005 | Watanabe et al. | ............. | 362/539 |
| 2009/0073712 A1 | 3/2009 | Yamamura et al. | | |
| 2013/0188376 A1* | 7/2013 | En et al. | ........................ | 362/510 |

FOREIGN PATENT DOCUMENTS

JP        2009-70679 A     4/2009

\* cited by examiner

*Primary Examiner* — Natalie Walford
(74) *Attorney, Agent, or Firm* — Kenealy Vaidya LLP

(57) ABSTRACT

A vehicle light is capable of preventing gaps (areas darker than peripheral areas) from being formed in between a plurality of illumination areas that are independently controlled to be illuminated with light or not to be illuminated with light, or suppressing the generation of such gaps. The vehicle light can include a projection lens and a light source unit disposed behind the rear-side focal plane of the projection lens. The light source unit can include a plurality of tubular portions each having a reflective inner peripheral surface, and a plurality of semiconductor light emitting elements. Exit openings of the plurality of tubular portions can be arranged side by side in a substantial horizontal direction behind the rear-side focal plane of the projection lens. Adjacent ones of the plurality of exit openings of the tubular portions can be defined and partitioned by a common vertical edge.

19 Claims, 14 Drawing Sheets

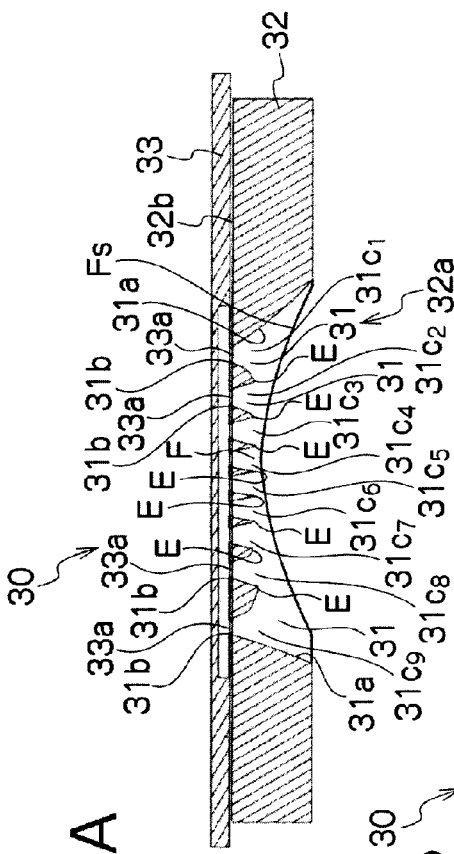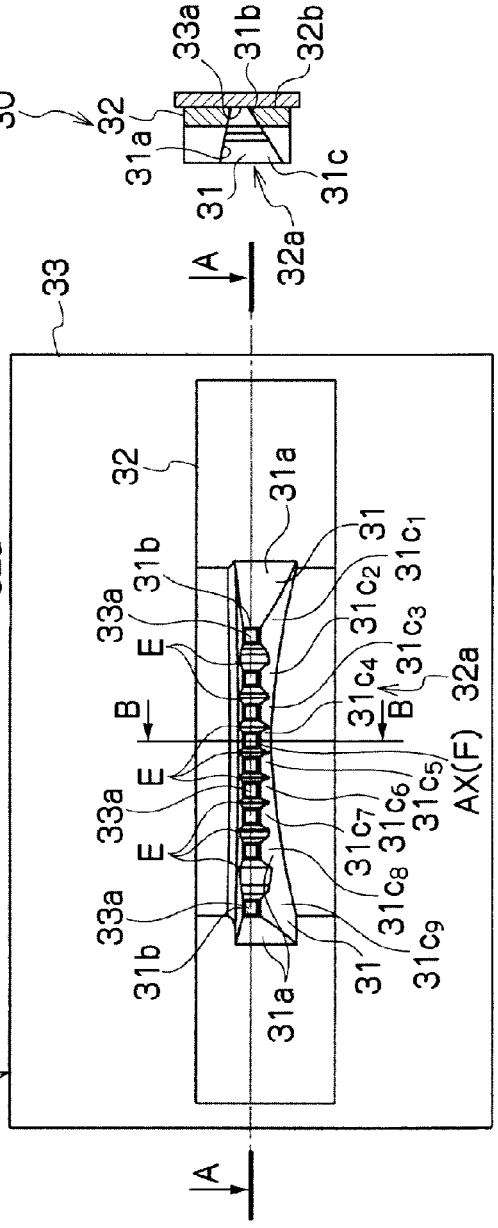

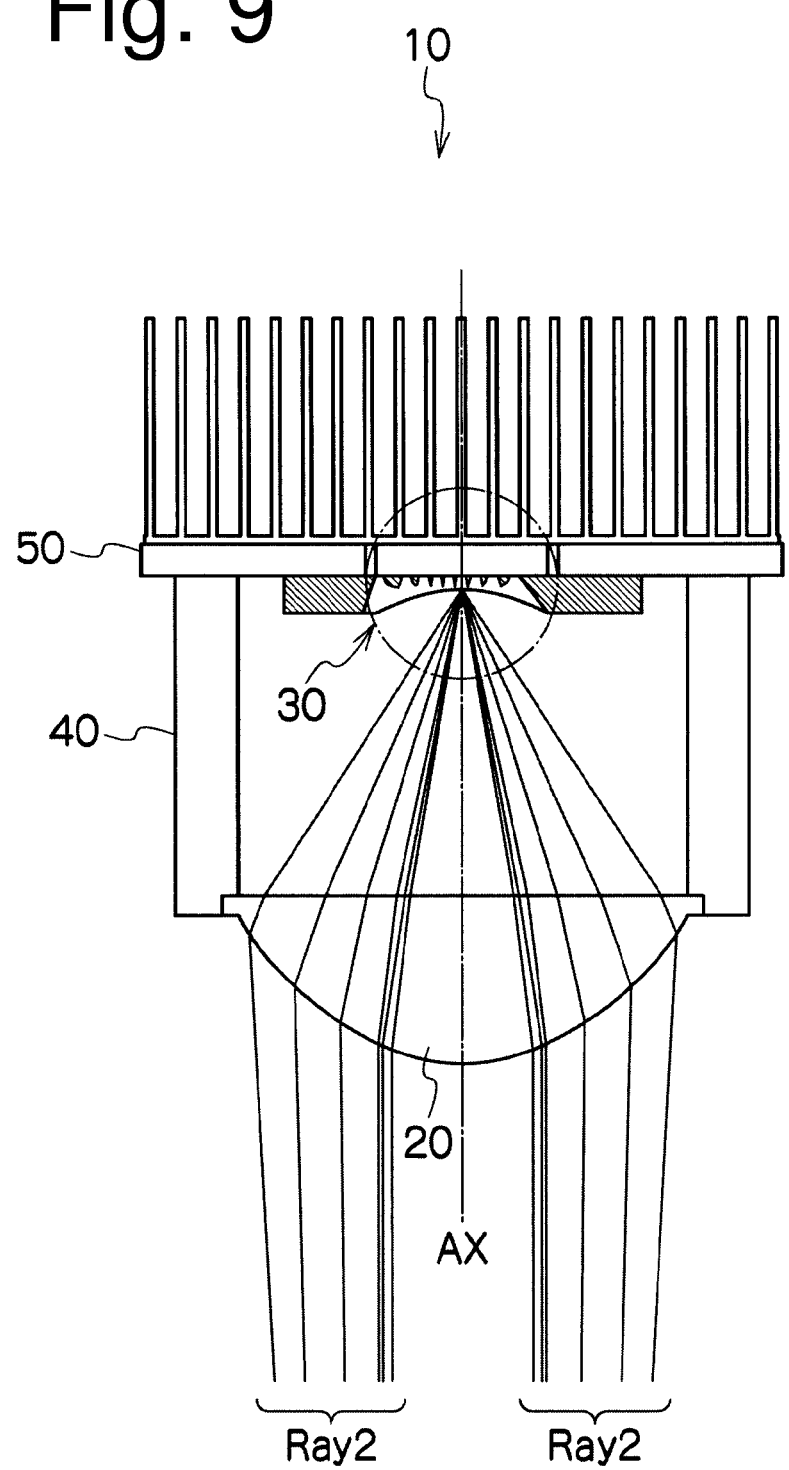

VEHICLE LIGHT

This application claims the priority benefit under 35 U.S.C. §119 of Japanese Patent Application No. 2011-256248 filed on Nov. 24, 2011, which is hereby incorporated in its entirety by reference.

TECHNICAL FIELD

The presently disclosed subject matter relates to vehicle lights and lighting units, and in particular, relates to a vehicle light and lighting unit capable of preventing gaps (areas darker than its peripheral areas) from being formed in between a plurality of illumination areas that are independently controlled to be illuminated with or without light, or suppressing the generation of such gaps.

BACKGROUND ART

Specific vehicle lights and lighting units have been conventionally known which can form a light distribution pattern including a plurality of illumination areas that are independently controlled to be illuminated with or without light.

FIG. 1 shows such a vehicle lighting unit 200 disclosed in Japanese Patent Application Laid-Open No. 2009-070679 (corresponding to U.S. Patent Application Publication No. 2009/0073712A1). The vehicle lighting unit 200 can include a plurality of tubular members 210 each having an inner peripheral surface 211 having been mirror finished, reflectors 220, and a plurality of light emitting elements 230. The plurality of light emitting elements 230 can emit light, and the light can be reflected by the respective corresponding reflectors 220 to enter the respective tubular members 210 through first ends 212 thereof. Then, the light thus entered can be reflected by the inner peripheral surfaces 211 to exit through the other ends 213 (exit openings) of the tubular members 210, thereby being projected to the plurality of illumination areas. Note that a projection lens 240 can be provided so that its rear-side focal plane is located at or near the exit openings 213 of the plurality of tubular members 210.

In the vehicle lighting unit 200 with the above-described configuration, the light emitted from the respective light emitting element 230 can be reflected by the respective reflectors 220 and the inner peripheral surfaces 211 of the respective tubular members 210, so that a uniform (or specific) luminous intensity distribution exists at the exit openings 213. Then, the image at the exit openings 213, or the uniform (or specific) luminous intensity distribution formed at the exit openings 213, can be reversed and projected forward by the action of the projection lens 240, thereby forming the light distribution pattern including a plurality of illumination areas that are independently controlled to be illuminated with or without light.

However, since the thick portions B are present between adjacent ones of the exit openings 213, the image of the thick portions B can also be projected, so that gaps (areas darker than peripheral areas) can be formed in between the plurality of illumination areas that are independently controlled to be illuminated with or without light, which constitutes a long-standing problem in terms of quality perception and presents a need to be resolved.

SUMMARY

The presently disclosed subject matter was devised in view of these and other problems and features and in association with the conventional art. According to an aspect of the presently disclosed subject matter, a vehicle light or lighting unit is capable of preventing gaps (areas darker than peripheral areas) from being formed in between a plurality of illumination areas that are independently controlled to be illuminated with or without light to be illuminated with light, or suppressing the generation of such gaps.

According to another aspect of the presently disclosed subject matter, a vehicle light or lighting unit having an optical axis extending in a front-to-rear direction of a vehicle body can include a projection lens disposed on or near (i.e., substantially at) the optical axis and having a rear-side focal plane, and a light source unit disposed behind the rear-side focal plane of the projection lens. The light source unit can include a plurality of tubular portions each having a reflective inner peripheral surface, an incoming opening at one end, and an exit opening at the other end, and a plurality of semiconductor light emitting elements configured to emit light that can enter a corresponding one of the tubular portions through the incoming opening, be reflected by the reflective inner peripheral surface, and exit through the exit opening. The exit openings of the plurality of tubular portions can be arranged side by side in a substantial horizontal direction behind the rear-side focal plane of the projection lens. Adjacent ones of the plurality of exit openings of the tubular portions can be defined by a common vertical edge while be partitioned by the common vertical edge. The plurality of tubular portions each can be configured to be a tapered cone shape being narrower from the exit opening to the incoming opening.

In the vehicle light or lighting unit with the above configuration, the exit openings of the plurality of tubular portions can be arranged side by side in a substantial horizontal direction behind the rear-side focal plane of the projection lens. Therefore, the light beams exiting from adjacent ones of the exit openings can partially overlap with each other on the rear-side focal plane of the projection lens. This means that overlapped areas and unoverlapped areas of light beams can be alternately arranged on the rear-side focal plane of the projection lens in the horizontal direction, thereby forming a continuous illuminance distribution. Then, the continuous illuminance distribution formed on the rear-side focal plane of the projection lens can be reversed and projected forward by the action of the projection lens. This can form a light distribution pattern including a plurality of illumination areas that are independently controlled to be illuminated with light or not (namely, the illuminance can be controlled independently in terms of areas) by the alternately and horizontally arranged overlapped areas and unoverlapped areas.

As described above, since the adjacent ones of the plurality of illumination areas can overlap with each other in the horizontal direction and the overlapped areas can cover the areas corresponding to the vertical edges of the tubular portions between adjacent ones thereof, the gaps generated by the vertical edges between the plurality of illumination areas, or unilluminated areas, and light streaks can be prevented from being formed in the reversed and projected image of the illumination distribution formed on the rear-side focal plane of the projection lens. This can suppress or control the illuminance unevenness (or light distribution unevenness).

Furthermore, in the vehicle light or lighting unit with the above configuration, the horizontal arrangement of the exit openings of the plurality of tubular portions behind the rear-side focal plane of the projection lens can allow the horizontal angle by which the light distribution pattern can be formed by the respective semiconductor light emitting elements (illumination areas) to be freely adjusted.

The vehicle light or lighting unit with the above configuration can further include a light guide member including the plurality of tubular portions. In this configuration, the plurality of semiconductor light emitting elements can be arranged in line in the horizontal direction and be directed so that their light emission surfaces are directed forward of the vehicle body. Furthermore, the light guiding member can be arranged in front of the plurality of semiconductor light emitting elements so that the light emitted from the plurality of semiconductor light emitting elements can enter the plurality of tubular portions through the incoming openings of the tubular portions.

In the vehicle light or lighting unit with the above configuration, since the plurality of semiconductor light emitting elements can be arranged in line in the horizontal direction while being directed so that their light emission surfaces are directed forward of the vehicle body, a smaller vehicle light or lighting unit in the optical axis direction can be formed as compared with a conventional case where a plurality of semiconductor light emitting elements are distributedly arranged in the optical axis direction.

As described above, according to an aspect of the presently disclosed subject matter, a vehicle light or lighting unit is capable of preventing gaps (areas darker than a light distribution pattern's peripheral areas) from being formed in between a plurality of illumination areas that are independently controlled to be illuminated with or without light, or suppressing the generation of such gaps.

BRIEF DESCRIPTION OF DRAWINGS

These and other characteristics, features, and advantages of the presently disclosed subject matter will become clear from the following description with reference to the accompanying drawings, wherein:

FIGS. 6A, 6B, and 6C are a cross-sectional view of a light source unit taken along line A-A in FIG. 6B, a front view of the same, and a cross-sectional view of the same taken along line B-B in FIG. 6B;

FIG. 9 is a horizontal cross-sectional view of the vehicle light of FIG. 3, schematically illustrating the state of FIG. 8A;

DESCRIPTION OF EXEMPLARY EMBODIMENTS

A description will now be made below to vehicle lights of the presently disclosed subject matter with reference to the accompanying drawings in accordance with exemplary embodiments.

Further, note that the directions of up, down (low), right, left, front, and rear (back), and the like are defined on the basis of the actual posture of a vehicle light or a headlight installed on a vehicle body, unless otherwise specified.

Figure 2:
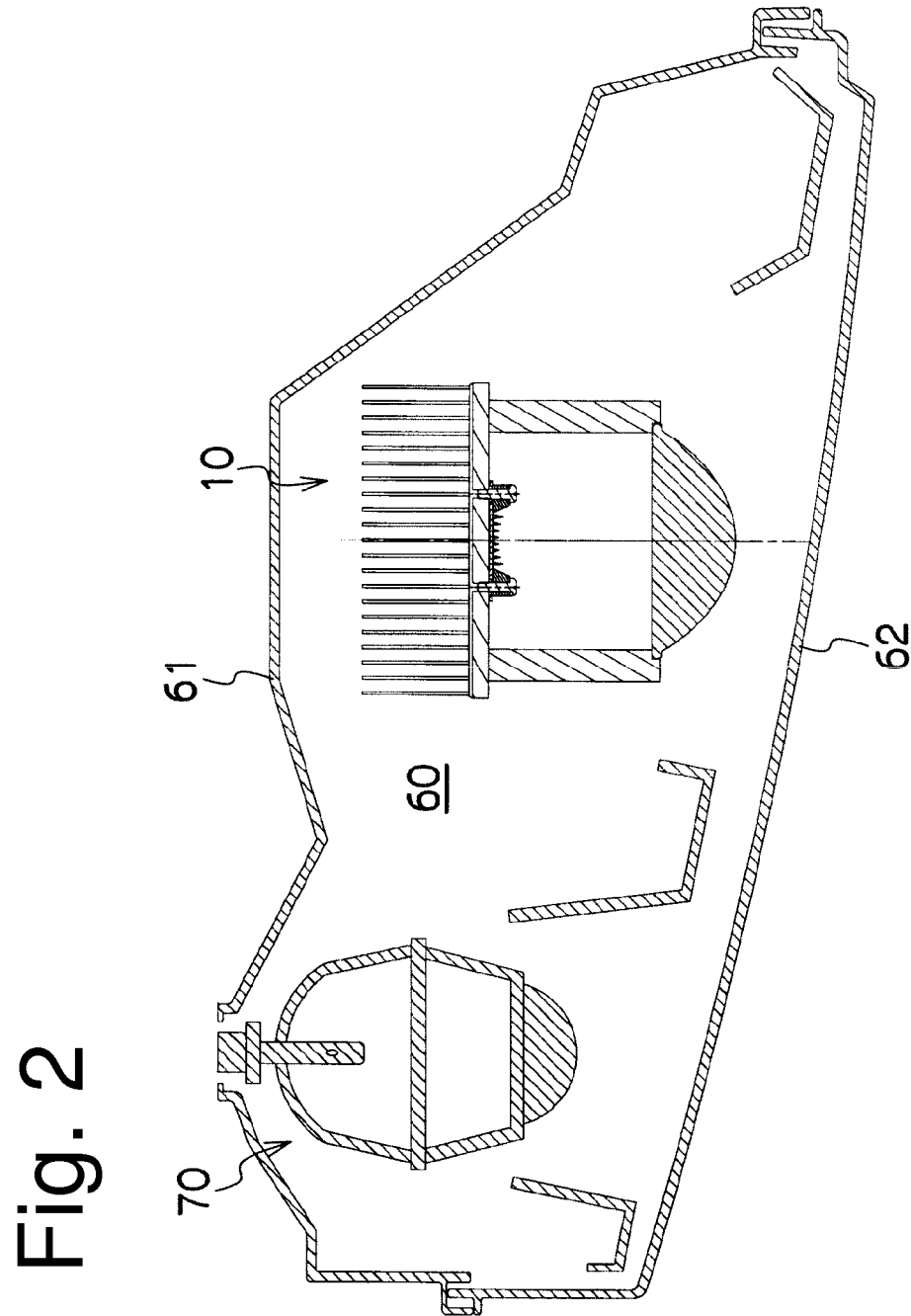
FIG. 2 is a horizontal cross-sectional view of a vehicle headlight including a vehicle light according an exemplary embodiment made in accordance with principles of the presently disclosed subject matter.

FIG. 2 is a horizontal cross-sectional view of a vehicle headlight including a vehicle light 10 according to an exemplary embodiment made in accordance with the principles of the presently disclosed subject matter.

As shown in FIG. 2, a vehicle headlight can include a housing 61, a transparent cover 62 which is combined with the housing 61 to define a lighting chamber 60, and the vehicle light 10 and a low beam light 70 which are disposed within the lighting chamber 60. Note that the drawing shows only part of the vehicle headlight system that can be arranged on either side of the vehicle front face. Further, note that the respective lights 10 and 70 can be coupled with a known aiming mechanism (not shown) so that its optical axis can be adjusted by the mechanism.

Figure 3:
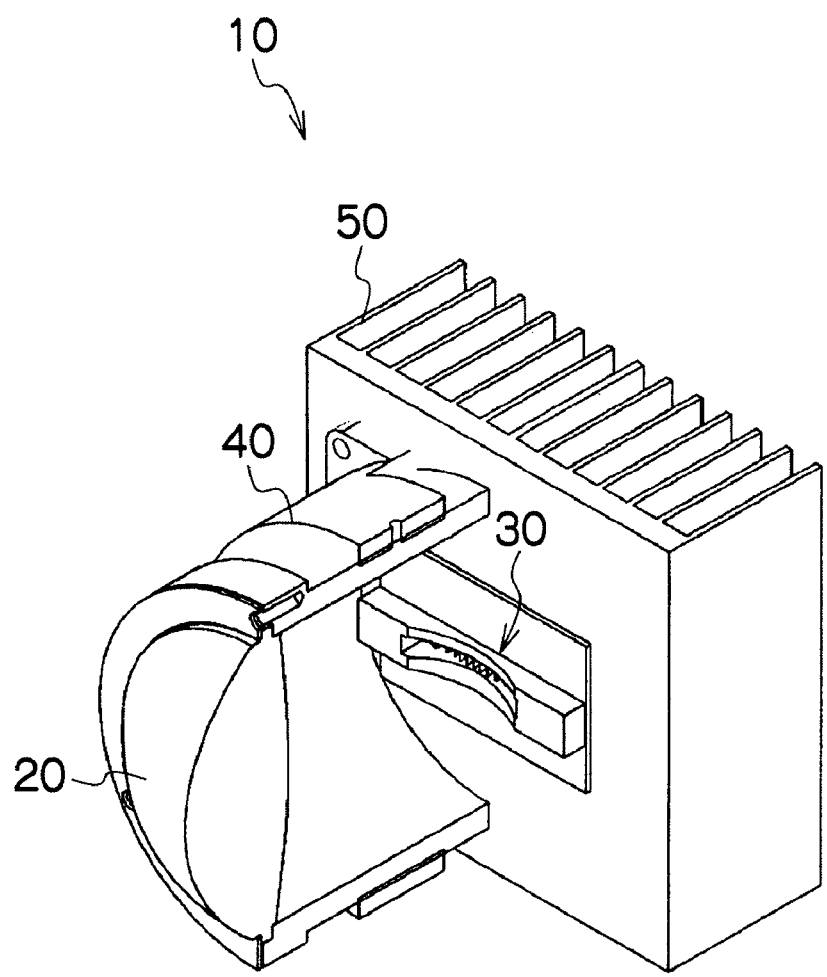
FIG. 3 is a perspective view of the vehicle light of FIG. 2 including partial cutaway portions for illustrating detailed structure.
Figure 4:
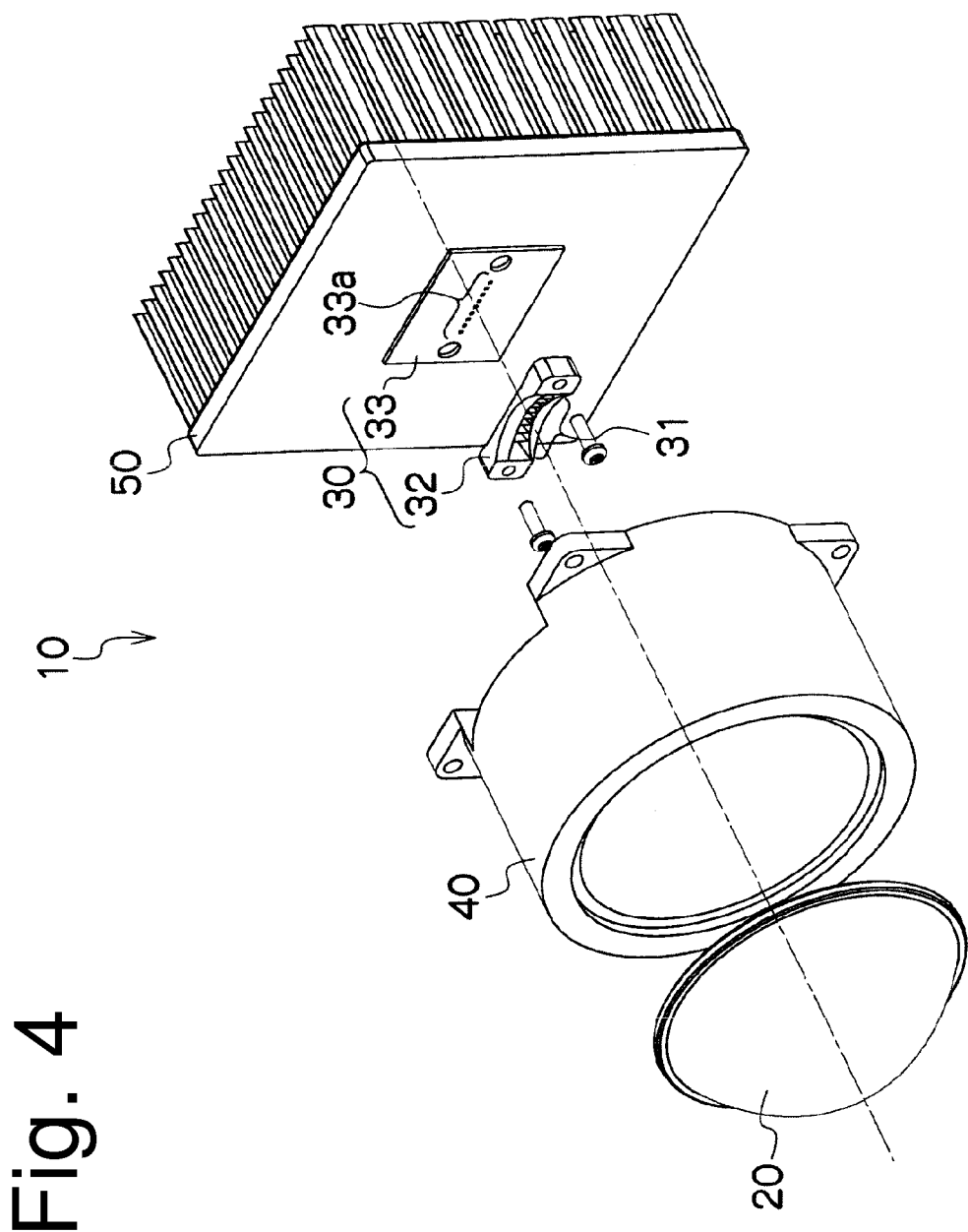
FIG. 4 is an exploded perspective view of the vehicle light of FIG. 3.
Figure 5A:
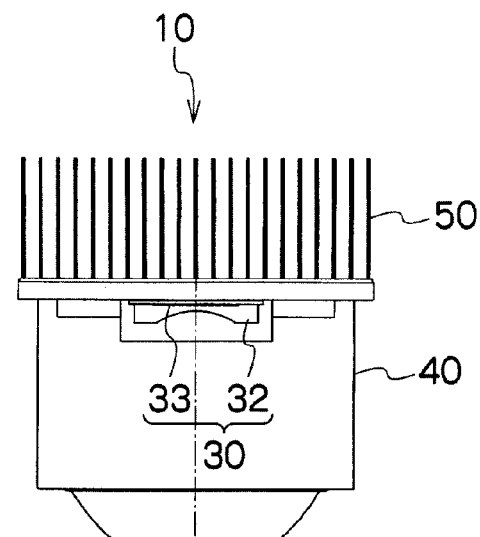
FIGS. 5A, 5B, and 5C are a top view, a front view, and a side view of the vehicle light of FIG. 3, respectively.
Figure 5B:
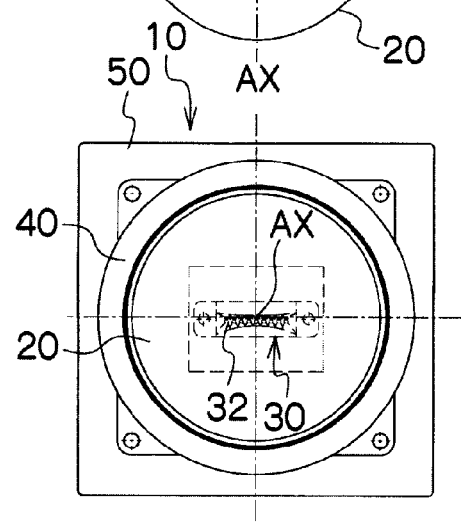
Figure 5C:
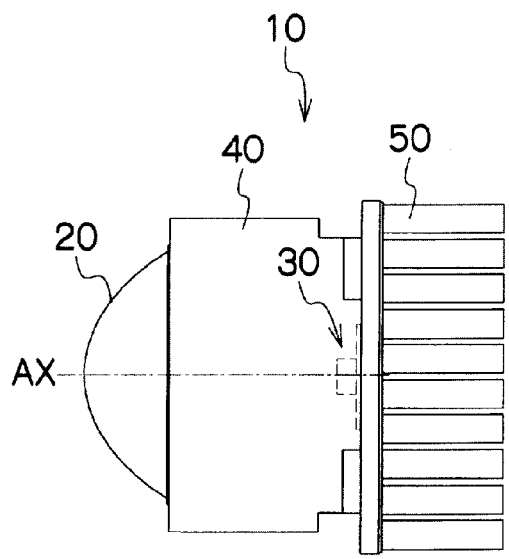

FIG. 3 is a perspective view of the vehicle light 10 including a partial cutaway portion for illustrating detailed structure, and FIG. 4 is an exploded perspective view of the vehicle light 10 of FIG. 3. Further, FIGS. 5A, 5B, and 5C are a top view, a front view, and a side view of the vehicle light 10 of FIG. 3, respectively.

As shown in FIGS. 3 to 5C, the vehicle light 10 can be a direct-projection type light, and can have an optical axis AX extending in the front-to-rear direction of the vehicle body and can include a projection lens 20 disposed on or near (i.e., substantially at) the optical axis AX and having a rear-side focal plane, a light source unit 30 disposed behind the rear-side focal plane of the projection lens 20, and the like.

The projection lens 20 can be an aspheric lens and can be disposed on the optical axis AX while being held by a lens holder 40 fixed by screw threads or other attachment device or scheme to a front face of a heat sink 50.

FIGS. 6A, 6B, and 6C are a cross-sectional view of the light source unit 30 taken along line A-A in FIG. 6B, a front view of the same, and a cross-sectional view of the same taken along line B-B in FIG. 6B.

As shown in FIGS. 6A to 6C, the light source unit 30 can include a light guide member 32 including a plurality of tubular portions 31, and a substrate 33 on which a plurality of semiconductor light emitting elements 33a are mounted. In this light source unit 30, each tubular portion 31 can be configured to have an inner peripheral reflection surface 31a, and an incoming opening 31b and an exit opening 31c at both ends thereof. The semiconductor light emitting element 33a can emit light so that the light can enter the tubular portion 31 through the incoming opening 31b and be reflected by the inner peripheral reflection surface 31a, and then exit the tubular portion 31 through the exit opening 31c. The exit openings 31c are denoted by 31C1 to 31C9.

The semiconductor light emitting element 33a can be a white LED having a structure in which a blue LED element (for example, nine blue LED elements with a light emission surface of 0.7 mm sides) is/are combined with a yellow phosphor (for example, a YAG phosphor).

The semiconductor light emitting elements 33a can be mounted on a substrate 33 while their light emission surfaces are directed forward (toward the projection lens 20). The substrate 33 can be fixed to the front surface of the heat sink 50 by a screw or other attachment structure or scheme. (See FIG. 5B.) The semiconductor light emitting elements 33a can be arranged in line at predetermined intervals so that one side of the element 33a extends along the horizontal direction perpendicular to the optical axis AX while they are symmetric with respect to the optical axis AX.

The semiconductor light emitting elements 33a can be electrically connected to a controller (not-shown) so that the controller can control the turning ON or OFF of the respective elements 33a individually. Note that the heat generated by the semiconductor light emitting elements 33a can be dissipated by the action of the heat sink 50. Further, note that the number of the semiconductor light emitting elements 33a can be 8 or smaller or 10 or larger other than 9.

The semiconductor light emitting element 33a is not limited to a white LED having a structure composed of a blue LED element combined with a yellow phosphor as long as the color of light emitted by the semiconductor light emitting element 33a satisfies a white range on the CIE chromaticity diagram as stipulated under the particular law, rule or regulation in which the light is to be operated. Examples of the semiconductor light emitting element 33a may include a white LED in which a blue LED element is combined with a green and red phosphor; a white LED in which a red LED element, a green LED element and a blue LED element are combined; and a white LED in which an ultraviolet LED element or a near-ultraviolet LED element and an RGB phosphor are combined. Even with these white LEDs, the concentration of the phosphor or the like can be adjusted to satisfy the emission color within the white area on the CIE chromaticity diagram as stipulated by particular law, rule or regulation. Further, the semiconductor light emitting element 33a can be a white light source in which a semiconductor laser and a phosphor are combined, for example.

Figure 7:
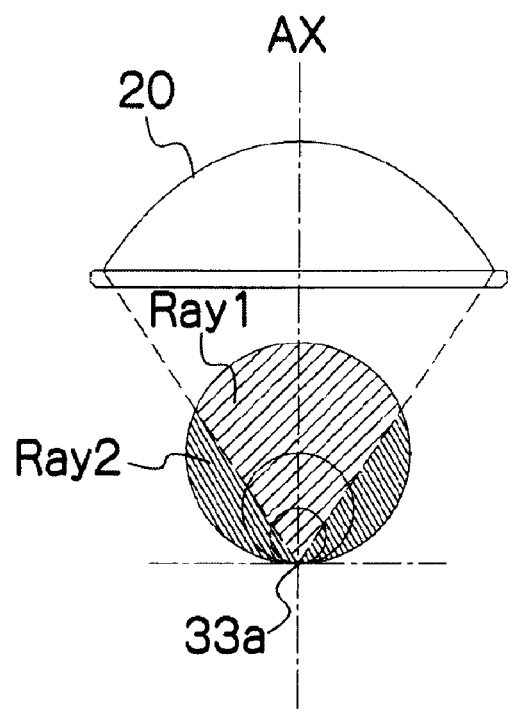
FIG. 7 is a diagram for illustrating the relationship between light rays emitted from a semiconductor light emitting element and a projection lens.

FIG. 7 is a diagram for illustrating the relationship between light rays emitted from the semiconductor light emitting element 33a and the projection lens 20.

As shown in FIG. 7, the light rays emitted from the semiconductor light emitting element 33a can include not only light rays Ray1 emitted in a narrower angle direction with respect to the optical axis AX but also light rays Ray 2 emitted in a wider angle direction with respect to the optical axis AX. In order to cause the light rays Ray2 emitted by the wider emission angle to be incident on the projection lens 20, the light guide member 32 configured to control the light rays Ray2 can be disposed in front of the semiconductor light emitting element 33a. (See FIGS. 6A and 6C.)

As shown in FIGS. 6A to 6C, the light guide member 32 can include a front surface 32a and a rear surface 32b. The plurality of tubular portions 31 can each be configured to have inner peripheral reflection surface 31a (having been minor finished such as via aluminum deposition) An incoming opening 31b can be formed in the rear surface 32b and an exit opening 31c can be formed in the front surface 32a at either ends of the tubular portions 31. The light guide member 32 can be formed of a heat-resistant plastic material by injection molding.

Figure 8A:
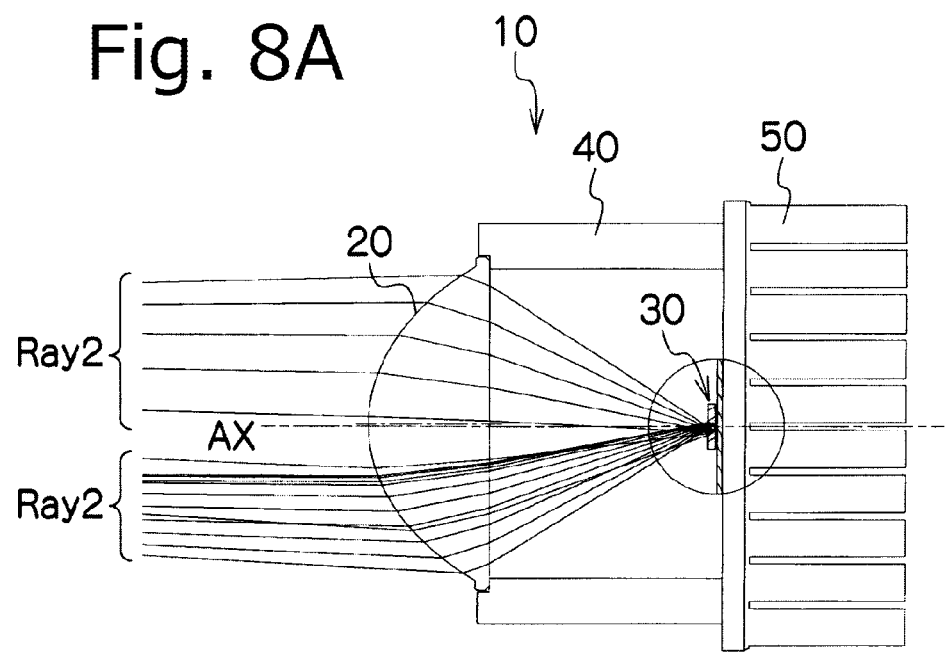
FIG. 8A is a vertical cross-sectional view of the vehicle light of FIG. 3, schematically illustrating a state wherein light rays Ray2 emitted from a semiconductor light emitting element in a wider angle direction with respect to an optical axis AX and entering a tubular portion can reflect once off the inner peripheral surface and exit through exit openings.
Figure 8B:
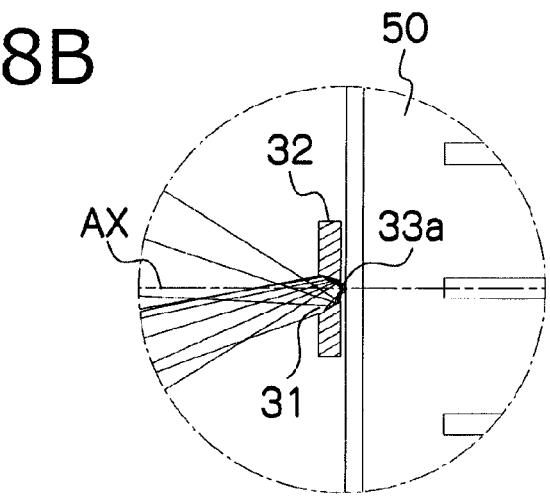
FIG. 8B is an enlarged view illustrating the encircled area of FIG. 8A.

FIG. 8A is a vertical cross-sectional view of the vehicle light 10 of FIG. 3, schematically illustrating a state wherein the light rays Ray2 emitted from a semiconductor light emitting element 33a in a wider angle direction with respect to the optical axis AX and entering the tubular portion 31 can reflect once off the inner peripheral surface and exit through exit opening 31c (including exit openings 31C1 to 31C9), and FIG. 8B is an enlarged view illustrating the encircled area of FIG. 8A. FIG. 9 is a horizontal cross-sectional view of the vehicle light of FIG. 3, schematically illustrating the state of FIG. 8A.

As shown in FIGS. 7A, 7B, 8A, and 8B, the tubular portion 31 including the reflection surface 31a can be configured to have a tapered cone shape being narrower from the exit opening 31c (including exit openings 31C1 to 31C9) to the incoming opening 31b so that the light rays Ray2 emitted from the semiconductor light emitting element 33a and entering the tubular portion 31 can reflect once off the inner peripheral reflection surface 31a and exit the tubular portion 31 through the exit opening 31c (including exit openings 31C1 to 31C9). Further, there are vertical edges E partitioning adjacent ones of the exit openings 31c (for example, the exit opening 31C1 and 31C2) of the tubular portions 31, and with the above configuration, the width of the vertical edge E can almost be ignored. (See FIGS. 6A and 6B.)

With the action of the tubular portions 31 having the inner peripheral reflection surfaces 31a, not only the light rays Ray1 emitted in the narrower angle direction with respect to the optical axis AX but also the light rays Ray2 emitted in the wider angle direction can be caused to be properly incident on the projection lens 20, thereby improving the light utilization efficiency. (See FIGS. 8A, 8B, and 9.)

Note that the concrete shape and the degree of tapered cone shape of the tubular portion 31 can be appropriately set in accordance with the required or desired properties or specification as long as the tubular portion 31 can have the tapered cone structure from the exit opening 31c (including exit openings 31C1 to 31C9) to the incoming opening 31b and a vertical edge E exists between adjacent ones of the exit openings 31C (for example, the exit opening 31C1 and 31C2) of which width can be ignored.

As shown in FIGS. 5A and 5C, the incoming opening 31b can have a slightly larger size than the semiconductor light emitting element 33a, for example, with a horizontal width of 1 mm and a vertical width of 1.5 mm in a rectangular shape, and can be disposed in front of the semiconductor light emitting element 33a. It should be noted that the center of the incoming opening 31b should be substantially aligned with the center of the emission surface of the semiconductor light emitting element 33a. Accordingly, the light rays Ray1 and Ray2 can enter the tubular portion 31 through the incoming opening 31b. Further, the incoming openings 31b can be arranged in line in the horizontal direction so as to be symmetric with respect to the optical axis AX. The incoming openings 31b, or the rear surface 32b of the light guide member 32, can be disposed about 2.0 mm behind the rear-side focal point F of the projection lens 20.

As shown in FIG. 6A, the exit openings 31c (including exit openings 31C1 to 31C9) can be in a substantial rectangular shape, and can be arranged in line in the horizontal direction so as to be symmetric with respect to the optical axis AX behind the rear-side focal plane Fs of the projection lens 20. Adjacent ones of the exit openings 31c (for example, the exit opening 31C1 and 31C2) of the tubular portions 31 can be partitioned by the vertical edge E.

Figure 12A:
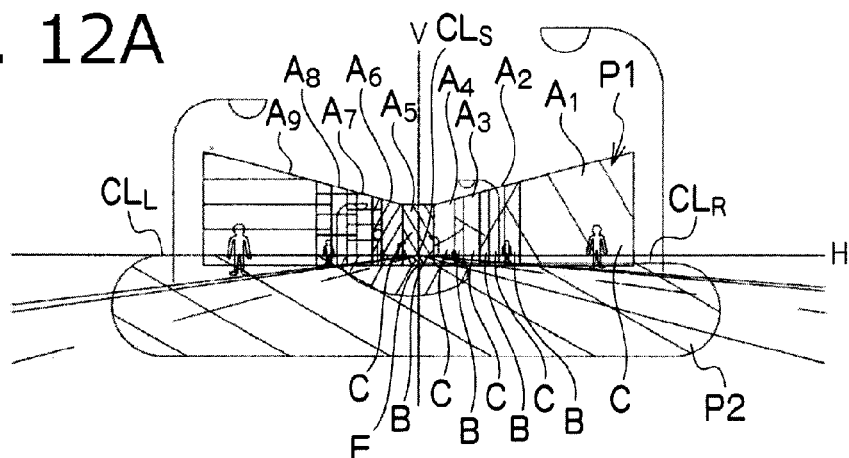
FIG. 12A is a diagram illustrating the light distribution pattern P1 formed by the vehicle light of FIG. 3 wherein all the semiconductor light emitting elements are turned on, FIG. 12B is a diagram illustrating the light distribution pattern P1 formed by the vehicle light of FIG. 3 wherein the semiconductor light emitting elements are turned on except for the semiconductor light emitting element 33a corresponding to an illumination area for covering the farther leading vehicle V1.

As shown in FIG. 6B, the upper edge of the exit openings 31c (including exit openings 31C1 to 31C9) can extend in the horizontal direction when viewed from its front. On the other hand, the lower edge of the exit openings 31c (including exit openings 31C1 to 31C9) can extend as an arc shape being convex upward when viewed from its front. This means that the exit openings 31c (including exit openings 31C1 to 31C9) can be formed to have a wider horizontal width and a wider vertical width as it departs from the optical axis AX. For example, the vertical width can vary within a range of 3 mm to 6 mm. The horizontal width of the exit openings 31C2 to 31C8 can be 2 mm while the horizontal width of the exit openings 31C1 and 31C8 can be 4.5 mm. This light source unit 30 can form illumination areas A1 to A9 on a virtual vertical screen (which is supposed to be disposed about 25 meters forward from the front surface of a vehicle body) with the height and width thereof being larger as it departs from the optical axis AX (or the farther illumination area may have smaller height and width while the nearer illumination area may have larger height and width as shown in FIG. 12A). This configuration can illuminate the farther area with light having a high luminous density while it can illuminate the nearer area with light having large width and height. Note that the vertical center of the exit opening 31c (including exit openings 31C1 to 31C9) can be designed to be disposed slightly below the horizontal plane including the optical axis AX, for example, by about 1 mm.

Next, a description will be given regarding why the exit openings 31c (including exit openings 31C1 to 31C9) are disposed behind the rear-side focal plane Fs of the projection lens 20 while comparing this configuration with the case where the exit opening 31c (including exit openings 31C1 to 31C9) are disposed in line in the horizontal direction along (on) the rear-side focal plane Fs of the projection lens 20.

Figure 10A:
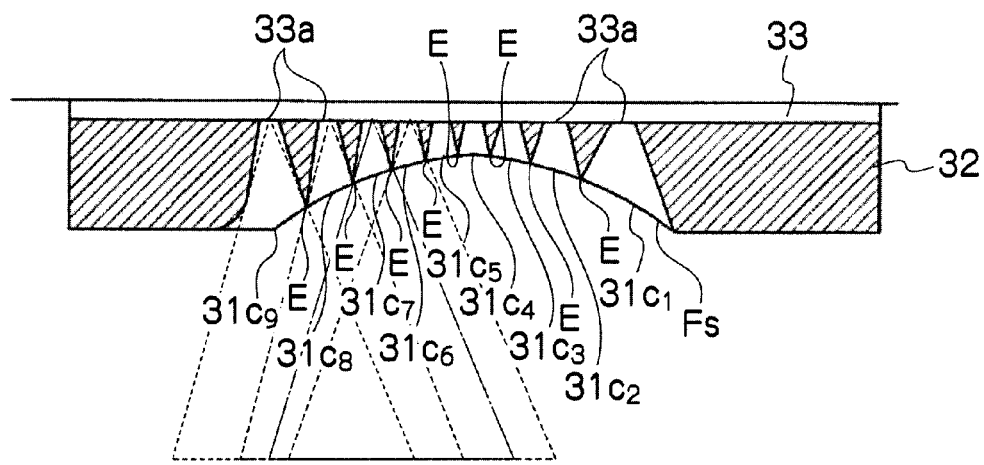
FIG. 10A is a horizontal cross-sectional view of a light source unit with exit openings 31C (including exit openings 31C1 to 31C9, and vertical edges E) arranged in line in the horizontal direction so that they are positioned along a rear-side focal plane Fs of the projection lens.
Figure 11A:
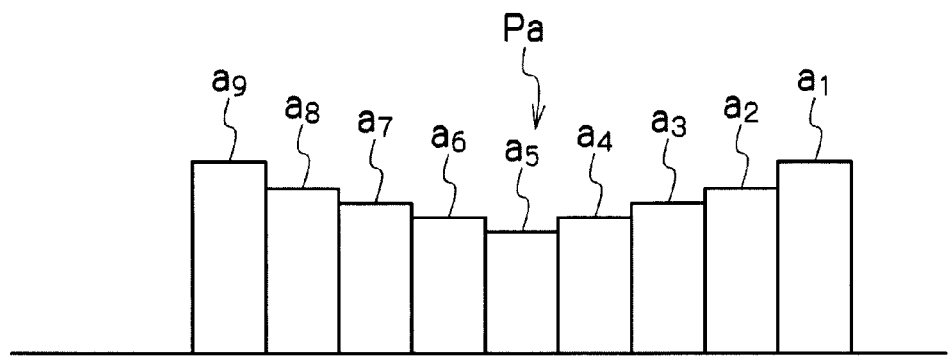
FIG. 11A is a schematic diagram of a light distribution pattern Pa formed by the light source unit of FIG. 10A.

FIG. 10A is a horizontal cross-sectional view of the light source unit 30 with the exit openings 31C (including exit openings 31C1 to 31C9, and vertical edges E) arranged in line in the horizontal direction so that they are positioned along the rear-side focal plane Fs of the projection lens 20. FIG. 11A is a schematic diagram of a light distribution pattern Pa formed by the light source unit 30 of FIG. 10A.

As shown in FIG. 10A, the illumination distribution formed at the exit openings 31C (including exit openings 31C1 to 31C9) disposed along (on) the rear-side focal plane Fs of the projection lens 20 can be reversed and projected forward by the action of the projection lens 20. In this manner, as shown in FIG. 11A, the light distribution pattern Pa formed by the light source unit 30 of FIG. 10A, including a plurality of horizontally adjacent illumination areas a1 to a9 that are independently controlled to be illuminated with light or to not be illuminated with light.

There are the vertical edges E partitioning adjacent ones of the exit openings 31c (for example, the exit opening 31C1 and 31C2) of the tubular portions 31, and with the above configuration, the width of the vertical edge E can almost be ignored. Accordingly, the plurality of illumination areas a1 to a9 that are the reversed and projected image of the illumination distribution formed at the exit openings 31C (including exit openings 31C1 to 31C9) are arranged horizontally side by side without gaps therebetween as long as the exit openings 31C (including exit openings 31C1 to 31C9, and the vertical edges E) can be positioned along (on) the rear-side focal plane Fs of the projection lens 20 with a certain accuracy. (See FIG. 11A.)

However, in reality, it is difficult to align the exit openings 31C (including exit openings 31C1 to 31C9, and the vertical edges E) along (on) the rear-side focal plane Fs of the projection lens 20 with a certain accuracy. In this case, there could be manufacturing errors of the projection lens 20, assembly errors, and the like, resulting in deviation of the exit openings 31C (including exit openings 31C1 to 31C9, and the vertical edges E) from the rear-side focal plane Fs of the projection lens 20. Accordingly, gaps (areas darker than peripheral areas), or unilluminated areas, generated by the vertical edges E, and light streaks, could be observed between the plurality of illumination areas a1 to a9, which are the reversed and projected image of the illumination distribution formed at the exit openings 31C (including exit openings 31C1 to 31C9).

This and other problems and characteristics can be addressed and/or resolved by the configuration made in accordance with principles of the presently disclosed subject matter, i.e., the exit openings 31c (including exit openings 31C1 to 31C9) which can be positioned behind the rear-side focal plane Fs of the projection lens 20.

Figure 10B:
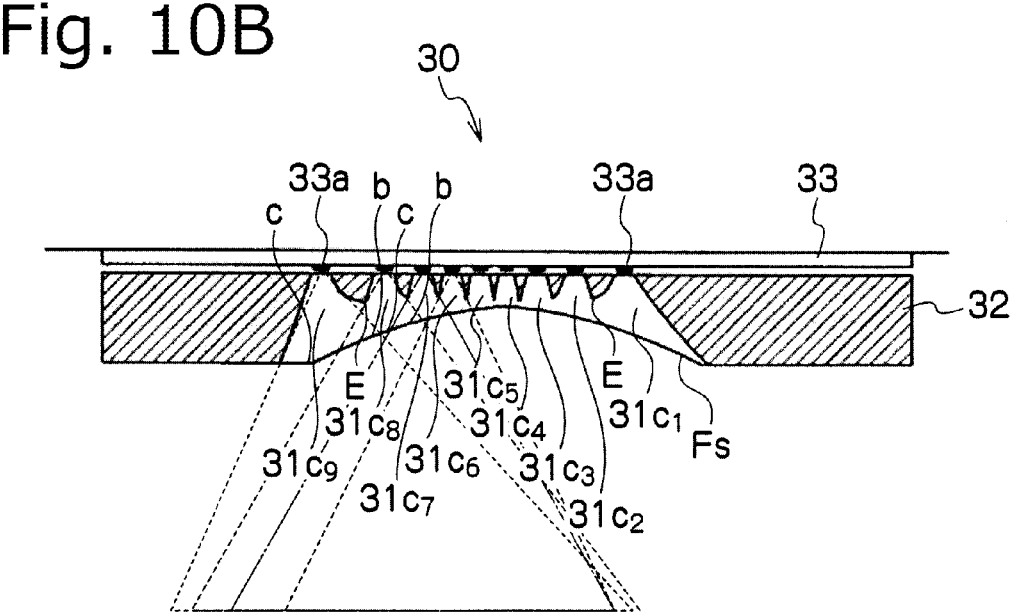
FIG. 10B is a horizontal cross-sectional view of a light source unit with exit openings 31C arranged in line in the horizontal direction so that they are positioned behind the rear-side focal plane Fs of the projection lens.
Figure 11B:
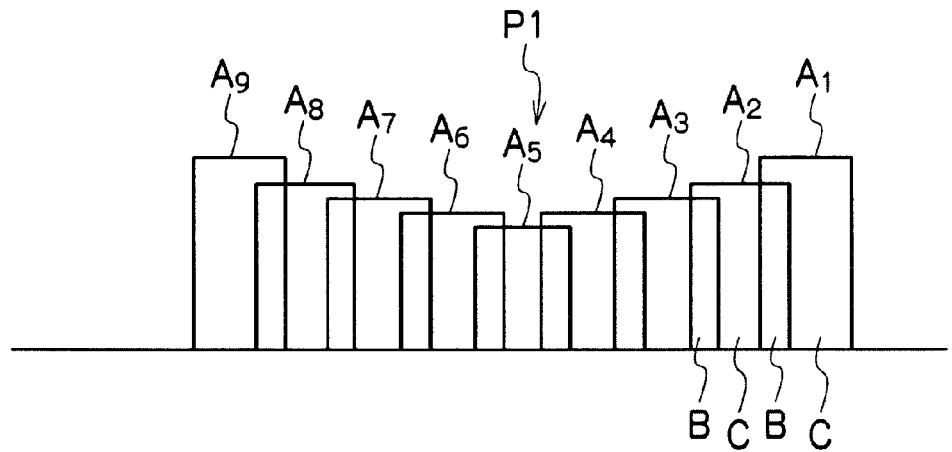
FIG. 11B is a schematic diagram of a light distribution pattern P1 formed by the light source unit of FIG. 10B.

FIG. 10B is a horizontal cross-sectional view of the light source unit 30 with the exit openings 31C (including exit openings 31C1 to 31C9, and vertical edges E) arranged in line in the horizontal direction so that they are positioned behind the rear-side focal plane Fs of the projection lens 20. FIG. 11B is a schematic diagram of a light distribution pattern P1 formed by the light source unit 30 of FIG. 10B.

As shown in FIG. 10B, the exit openings 31C (including exit openings 31C1 to 31C9, and vertical edges E) can be arranged side by side in line in the substantial horizontal direction behind the rear-side focal plane Fs of the projection lens 20. Therefore, the light beams exiting from adjacent ones (for example, exit openings 31C8 and 31C9) of the exit openings 31c (including exit openings 31C1 to 31C9) can partially overlap with each other on the rear-side focal plane Fs of the projection lens 20. (See reference sign "b" in FIG. 10B.) This configuration can form overlapped areas "b" and unoverlapped areas "c" of light beams alternately and continuously arranged on the rear-side focal plane Fs of the projection lens 20 in the horizontal direction, thereby forming a continuous illuminance distribution.

Then, the continuous illuminance distribution formed on the rear-side focal plane Fs of the projection lens 20 can be reversed and projected forward by the action of the projection lens 20. This can form the light distribution pattern P1 including the plurality of illumination areas A1 to A9 that are independently controlled to be illuminated with or without light (namely, the illuminance can be controlled independently in terms of areas) by the alternately and horizontally arranged overlapped areas "B" and unoverlapped areas "C" as shown in FIGS. 11B and 12A to 12C.

As described above, the adjacent ones (for example, illumination areas A1 and A2) of the plurality of illumination areas A1 to A9 can overlap with each other in the horizontal direction (meaning that the overlapped areas "b" can cover the areas corresponding to the vertical edges E between adjacent exit openings).

Accordingly, even if the exit openings 31C (including exit openings 31C1 to 31C9, and the vertical edges E) deviate with respect to the rear-side focal plane Fs of the projection lens 20 due to manufacturing or assembly errors of the projection lens 20, or other manufacturing and/r assembly errors, and the like, the gaps (areas darker than peripheral areas), or unilluminated areas, generated by the vertical edges E, and light streaks can be prevented from being formed in between the plurality of illumination areas A1 to A9, or in the reversed and projected image of the illumination distribution formed on the rear-side focal plane Fs of the projection lens 20. This can also suppress or control the illuminance unevenness (or light distribution unevenness).

Furthermore, in the vehicle light 10 with the above configuration, the horizontal arrangement of the exit openings 31c (including exit openings 31C1 to 31C9, and the vertical edges E) behind the rear-side focal plane Fs of the projection lens 20 can allow the horizontal angle by which the light distribution pattern can be formed by the respective semiconductor light emitting elements 33a (illumination areas A1 to A9) to be freely adjusted. For example, the shape of the tubular portions 31 (the inner peripheral reflection surfaces 31a) can be adjusted, as shown in FIG. 10B, thereby causing the outer exit openings 31c (for example, exit openings 31C1 and 31C9) to emit light beams by an inwardly sharper angle. With this configuration, the plurality of illumination areas (for example, illumination areas A2 to A8) that are independently controlled to be illuminated with or without light (namely, the illuminance can be controlled independently in terms of areas) can be narrowed in the horizontal direction while they can be arranged densely near to the optical axis AX. (See FIG. 12A.)

The advantages of the narrow illumination areas that are arranged densely are as follows.

Specifically, the farther vehicle body (leading vehicle or oncoming vehicle) in front of the subject vehicle body may have a smaller apparent size and travel at a slower apparent speed than the nearer vehicle body (leading vehicle or oncoming vehicle) in front of the subject vehicle. Accordingly, since the plurality of illumination areas (for example, illumination areas A2 to A8) can be narrowed in the horizontal direction while they can be arranged densely near to the optical axis AX, it is possible to independently control the power (turn ON and OFF) of the respective illumination areas (for example, illumination areas A2 to A8) in accordance with the position of the farther vehicle body (leading vehicle or oncoming vehicle) in front of the subject vehicle body, with a smaller apparent size and at a slower apparent travelling speed.

Note that the shape of the exit opening 31c can be a parallelogram, a trapezoid, or the like in addition to a rectangle.

The light guide member 32 can be fixed to the front surface of the heat sink 50 by a screw or other attachment structure or system while the incoming openings 31b are positioned in the vicinity of the semiconductor light emitting elements 33a. (See FIG. 4 and the like.)

Next, a description will be given of the light distribution pattern P1 formed by the vehicle light 10 with the above configuration.

The light rays Ray1 that are emitted from the semiconductor light emitting element 33a in the narrower angle direction with respect to the optical axis AX can enter the tubular portion 31 through the incoming opening 31b and exit the same through the exit opening 31c (including exit openings 31C1 to 31C9) without reflecting off the inner peripheral reflection surface 31a to be incident on the projection lens 20. On the other hand, the light rays Ray2 emitted from the semiconductor light emitting element 33a in the wider angle direction with respect to the optical axis AX can enter the tubular portion 31 through the incoming opening 31b and can reflect once off the inner peripheral reflection surface 31a and then exit through the exit opening 31c (including exit openings 31C1 to 31C9) to be incident on the projection lens 20. (See FIGS. 8A, 8B, and 9.) In this case, the direct light rays Ray1 and the reflecting-once light rays Ray2 can form the overlapped areas "b" and the unoverlapped areas "c" of light beams alternately and continuously arranged on the rear-side focal plane Fs of the projection lens 20 in the horizontal direction, thereby forming a continuous illuminance distribution. (See FIG. 10B.)

Then, the illuminance distribution formed on the rear-side focal plane Fs of the projection lens 20 can be reversed and projected forward by the action of the projection lens 20. This can form the light distribution pattern P1 including the plurality of illumination areas A1 to A9 that are independently controlled to be illuminated with or without light (namely, the illuminance can be controlled independently in terms of areas) by the alternately and horizontally arranged overlapped areas "B" and unoverlapped areas "C" on a virtual vertical screen (which is supposed to be disposed about 25 meters forward from the front surface of a vehicle body) as shown in FIGS. 11B and 12A. Note that an image of 1 mm square on the rear-side focal plane Fs of the projection lens 20 can be formed as an image projected by 1 degree in the vertical and horizontal directions on the virtual vertical screen.

A description will be given of how the illumination areas A1 to A9 are arranged in the horizontal direction. For example, suppose the case where the exit opening 31C2 to 31C8 can have a rectangular shape with a vertical width of 3 mm and a horizontal width of 2 mm and each have a center arranged on a horizontal plane including the optical axis AX. Therefore, the illumination areas A2 to A8 corresponding to the exit openings 31C2 to 31C8 can be configured such that the respective centers thereof are positioned on the H-H line and they have a rectangular shape with a vertical width of 3 degrees and a horizontal width of 2 degrees.

Further suppose the case where the exit opening 31C1 and 31C8 can have a rectangular shape with a vertical width of 3 mm and a horizontal width of 4.5 mm and can be arranged outside the exit opening 31C2 to 31C8. Therefore, the illumination areas A1 and A9 corresponding to the exit openings 31C1 and 31C9 can have a rectangular shape with a vertical width of 3 degrees and a horizontal width of 4.5 degrees and can be arranged outside the illumination areas A2 to A8.

A description will now be given of a low beam light distribution pattern P2 formed by the low beam light 70.

As shown in FIG. 12A, the low beam light distribution P2 can have a cut-off line at its upper edge with a stepped edge.

Specifically, the cut-off line can extend horizontally while being stepped at the V-V line (the vanishing point in front of the vehicle light). The right side of the cut-off line with respect to the V-V line can be formed as a cut-off line CLR for an opposite lane while the left side of the cut-off line with respect to the V-V line can be formed as a cut-off line CLL for an own lane at an upper level than the cut-off line CLR. The end of the cut-off line CLL near the V-V line can be connected to an oblique cut-off line CLS, which can extend from the crossing point between the cut-off line CLR and the V-V line by an angle of 15 degrees obliquely leftward and upward.

An elbow point E, or the crossing point between the cut-off line CLR and the V-V line in the low beam light distribution pattern P2 can be positioned below the H-H line by about 0.5 to 0.6 degrees. Furthermore, a hot zone, or high intensity area, can be formed to surround the elbow point E from its left side.

The thus formed light distribution patterns P1 and P2 can be superimposed to form a combined light distribution pattern as shown in FIG. 12A.

A description will now be given of an example where the plurality of illumination areas A1 to A9 are independently controlled to be illuminated with or without light (or the plurality of semiconductor light emitting elements 33a are independently controlled to be turned on or off).

It should be noted that in the following example the respective semiconductor light emitting elements 33a and detection device mounted in a leading vehicle, an oncoming vehicle, and the like are electrically connected to a controller (not shown).

FIG. 12A is a diagram illustrating the light distribution pattern P1 formed by the vehicle light 10 wherein all the semiconductor light emitting elements 33a are turned on. If no farther leading vehicle V1 (or oncoming vehicle V2) is detected in front of the own/subject vehicle, the controller can turn on all the semiconductor light emitting elements 33a.

Figure 12B:
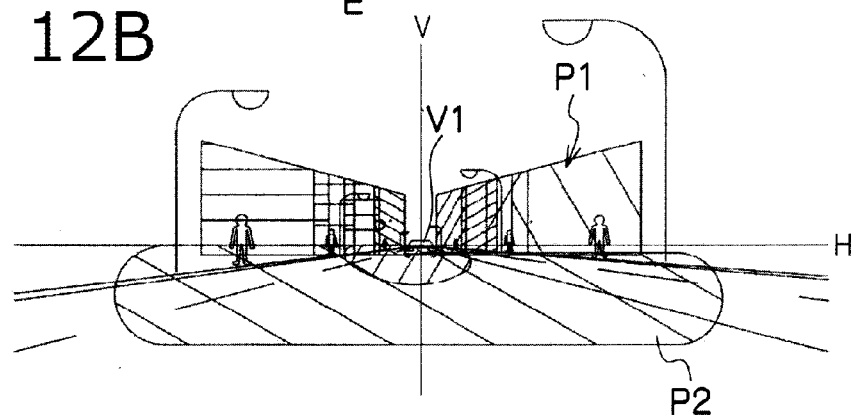
FIG. 12C is a diagram illustrating the light distribution pattern P1 formed by the vehicle light of FIG. 3 wherein the semiconductor light emitting elements are turned on except for the semiconductor light emitting element corresponding to an illumination area for covering the nearer leading vehicle V1.
Figure 13A:
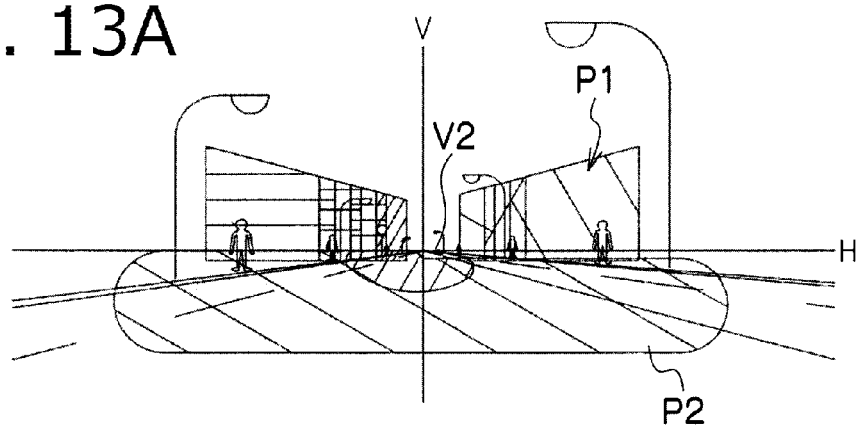
FIG. 13A is a diagram illustrating the light distribution pattern P1 formed by the vehicle light of FIG. 3 wherein the semiconductor light emitting elements are turned on except for the semiconductor light emitting element corresponding to an illumination area for covering the farther oncoming vehicle V2.
Figure 13B:
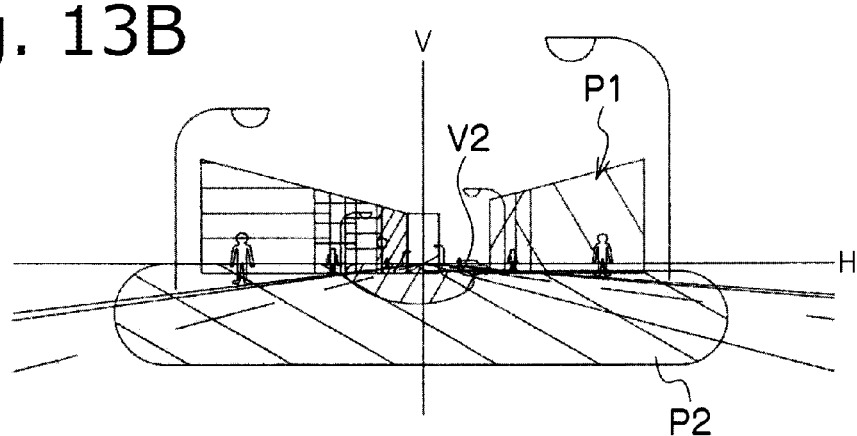
FIG. 13B is a diagram illustrating the light distribution pattern P1 formed by the vehicle light of FIG. 3 wherein the semiconductor light emitting elements are turned on except for the semiconductor light emitting elements corresponding to an illumination area for covering the farther oncoming vehicle V2.

Next, if any farther leading vehicle V1 (or oncoming vehicle V2 on the opposite lane as shown in FIGS. 13A and 13B) is detected in front of the own/subject vehicle as shown in FIG. 12B, the controller can turn on the semiconductor light emitting elements 33a except for the semiconductor light emitting element 33a corresponding to an illumination area for covering the farther leading vehicle V1 (or oncoming vehicle V2) among the plurality of illumination areas A1 to A9. Alternatively, the semiconductor light emitting element 33a corresponding to the illumination area for covering the farther leading vehicle V1 (or oncoming vehicle V2) can be controlled to emit less light. This configuration can prevent the generation of glare light with respect to the farther leading vehicle V1 (or oncoming vehicle V2) as well as enhance the visibility of the road surface in front of the own/subject vehicle.

Figure 12C:
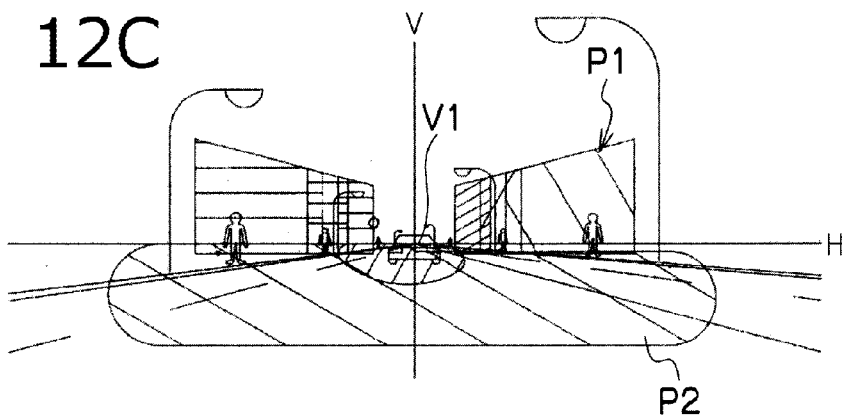
Figure 13C:
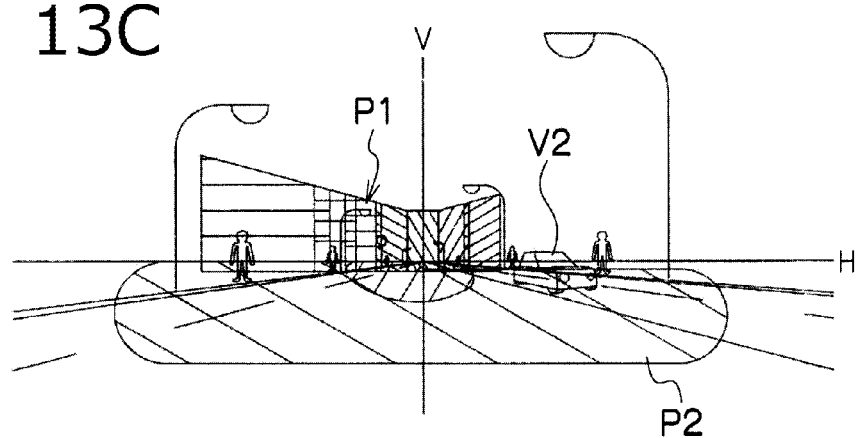
FIG. 13C is a diagram illustrating the light distribution pattern P1 formed by the vehicle light of FIG. 3 wherein the semiconductor light emitting elements are turned on except for the semiconductor light emitting element corresponding to an illumination area for covering the nearer oncoming vehicle V2.

On the other hand, if the leading vehicle V1 is close to the own/subject vehicle as shown in FIG. 12C (or the oncoming vehicle V2 is close to the own/subject vehicle as shown in FIG. 13C) or the nearer leading vehicle V1 (or oncoming vehicle V2) is detected, the controller can turn on the semiconductor light emitting elements 33a except for the semiconductor light emitting element 33a corresponding to an illumination area for covering the nearer leading vehicle V1 (or oncoming vehicle V2) among the plurality of illumination areas A1 to A9 (or the semiconductor light emitting element 33a corresponding to the illumination area for covering the nearer leading vehicle V1 (or oncoming vehicle V2) can be controlled to emit less light). This configuration can prevent the generation of glare light with respect to the nearer leading vehicle V1 (or oncoming vehicle V2) as well as enhance the visibility of the road surface in front of the own/subject vehicle. Examples of the detecting device that detects positions of a leading vehicle V1 or an oncoming vehicle V2 as positions on the virtual vertical screen may include a device that detects the positions on the basis of a captured image containing the leading vehicle V1 or oncoming vehicle V2. For example, a CCD camera or the like can capture an image including the vehicle, and a detection device can determine the position of the taillight of the leading vehicle V1 (or the headlight of the oncoming vehicle V2) on the basis of the captured image using the positions of high density pixels, for example.

As described above, according to the present exemplary embodiment, as shown in FIG. 10B, the exit openings 31C (including exit openings 31C1 to 31C9, and vertical edges E) can be arranged side by side in line in the substantial horizontal direction behind the rear-side focal plane Fs of the projection lens 20. Therefore, the light beams exiting from adjacent ones (for example, exit openings 31C8 and 31C9) of the exit openings 31c (including exit openings 31C1 to 31C9) can partially overlap with each other on the rear-side focal plane Fs of the projection lens 20. (See reference sign "b" in FIG. 10B.) This configuration can form the overlapped areas "b" and the unoverlapped areas "c" of light beams alternately and continuously arranged on the rear-side focal plane Fs of the projection lens 20 in the horizontal direction, thereby forming the continuous illuminance distribution.

Then, the continuous illuminance distribution formed on the rear-side focal plane Fs of the projection lens 20 can be reversed and projected forward by the action of the projection lens 20.

This can form the light distribution pattern P1 including the plurality of illumination areas A1 to A9 that are independently controlled to be illuminated with or without light (namely, the illuminance can be controlled independently in terms of areas) by the alternately and horizontally arranged overlapped areas "B" and unoverlapped areas "C" as shown in FIGS. 11B and 12A to 12C.

As described above, the adjacent ones (for example, illumination areas A1 and A2) of the plurality of illumination areas A1 to A9 can overlap with each other in the horizontal direction (meaning that the overlapped areas "b" can cover the areas corresponding to the vertical edges E between adjacent exit openings). Accordingly, the gaps (areas darker than peripheral areas), or unilluminated areas, generated by the vertical edges E, and light streaks can be prevented (or suppressed) from being formed in between the plurality of illumination areas A1 to A9, or the reversed and projected image of the illumination distribution formed on the rear-side focal plane Fs of the projection lens 20. This can also suppress or control the illuminance unevenness (or light distribution unevenness). It should be noted that in a conventional light in order to compensate for the darkened area between the plurality of illumination areas, an additional light may be required.

Furthermore, as described above, the horizontal arrangement of the exit openings 31c (including exit openings 31C1 to 31C9, and the vertical edges E) behind the rear-side focal plane Fs of the projection lens 20 can allow the horizontal angle by which the light distribution pattern can be formed by the respective semiconductor light emitting elements 33a (illumination areas A1 to A9) to be freely adjusted. For example, the shape of the tubular portions 31 (the inner peripheral reflection surfaces 31a) can be adjusted, as shown in FIG. 10B, thereby causing the outer exit openings 31c (for example, exit openings 31C1 and 31C9) to emit light beams by an inwardly sharper angle. With this configuration, the plurality of illumination areas A1 to A9 that are independently controlled to be illuminated with or without light (namely, the illuminance can be controlled independently in terms of areas) can be narrowed in the horizontal direction while they can be arranged densely near to the optical axis AX.

Figure 1:
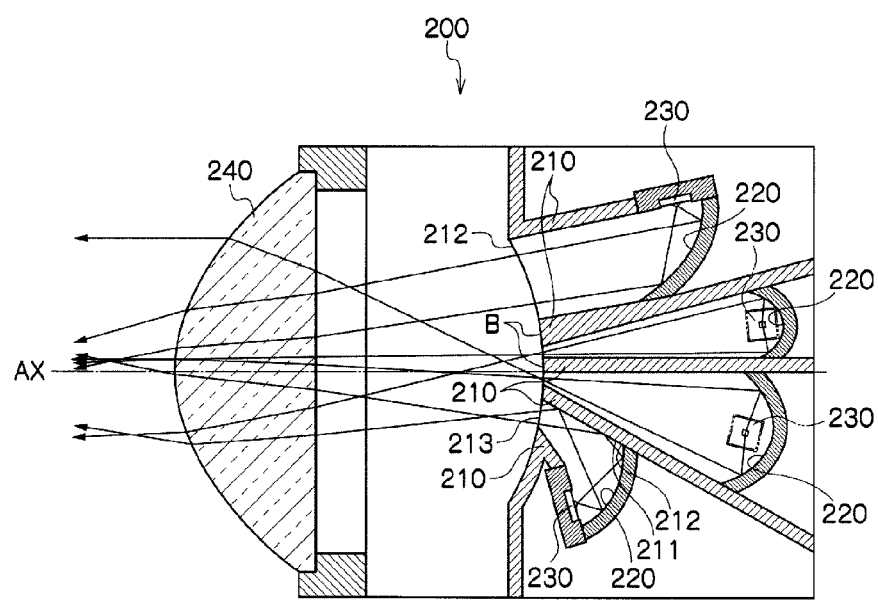
FIG. 1 is a cross-sectional view of a conventional vehicle light that can form a plurality of illumination areas that are independently controlled to be illuminated with light or not to be illuminated with light.

According to the present exemplary embodiment, since the plurality of semiconductor light emitting elements 33a can be arranged in line in the horizontal direction while being directed so that their light emission surfaces are directed forward of the vehicle body (see FIG. 4 or the like), a smaller vehicle light in the optical axis AX direction can be formed as compared with a conventional case where a plurality of semiconductor light emitting elements are distributedly arranged in the optical axis direction (See light emitting element 230 in FIG. 1).

Further according to the present exemplary embodiment, as shown in FIGS. 7A, 7B, and 8, the tubular portion 31 including the reflection surface 31a can be configured to be a tapered cone shape being narrower from the exit opening 31c (including exit openings 31C1 to 31C9) to the incoming opening 31b so that the light rays Ray2 emitted from the semiconductor light emitting element 33a and entering the tubular portion 31 can reflect once off the inner peripheral reflection surface 31a and exit the tubular portion 31 through the exit opening 31c (including exit openings 31C1 to 31C9). With the action of the tubular portions 31 having the inner peripheral reflection surfaces 31a, not only the light rays Ray1 emitted in the narrower angle direction with respect to the optical axis AX but also the light rays Ray2 emitted in the wider angle direction can be properly incident on the projection lens 20, thereby improving the light utilization efficiency.

In addition, according to the present exemplary embodiment, there is no reflector required. Therefore, when compared with the conventional vehicle light with the reflector (see the reflector 220 in FIG. 1), the vehicle light of the present embodiment can be composed of less number of components.

According to the present exemplary embodiment, the plurality of semiconductor light emitting elements 33a can be mounted on a single substrate 33, meaning that the plurality of semiconductor light emitting elements 33a can be formed as a unit. Therefore, when compared with the case where a plurality of light emitting elements are distributedly disposed in the optical axis AX direction without being mounted on a single substrate (see the light emitting element 230 in FIG. 1), the plurality of semiconductor light emitting elements 33a as a unit can be assembled easily, quickly, and properly. In addition to this, the positioning of the plurality of semiconductor light emitting elements 33a with respect to the plurality of tubular portions 31 can be facilitated with higher accuracy.

According to the present exemplary embodiment, an image of the plurality of semiconductor light emitting elements 33a themselves is not projected, but instead the illumination distribution formed on the rear-side focal plane Fs of the projection lens 20 is reversed and projected forward. When compared with the case where the images of the plurality of semiconductor light emitting elements themselves are reversed and projected, the distance between adjacent ones of the plurality of semiconductor light emitting elements 33a themselves can be enlarged. This can alleviate the adverse effect of the heat generated by the energized semiconductor light emitting elements 33a.

A description will now be given of a modified example.

In the above-mentioned exemplary embodiment, the lower edge of the exit openings 31c (including exit openings 31C1 to 31C9) can extend as an arc shape being convex upward when viewed from its front as shown in FIG. 6B, to which the presently disclosed subject matter is not limited.

Figure 14:
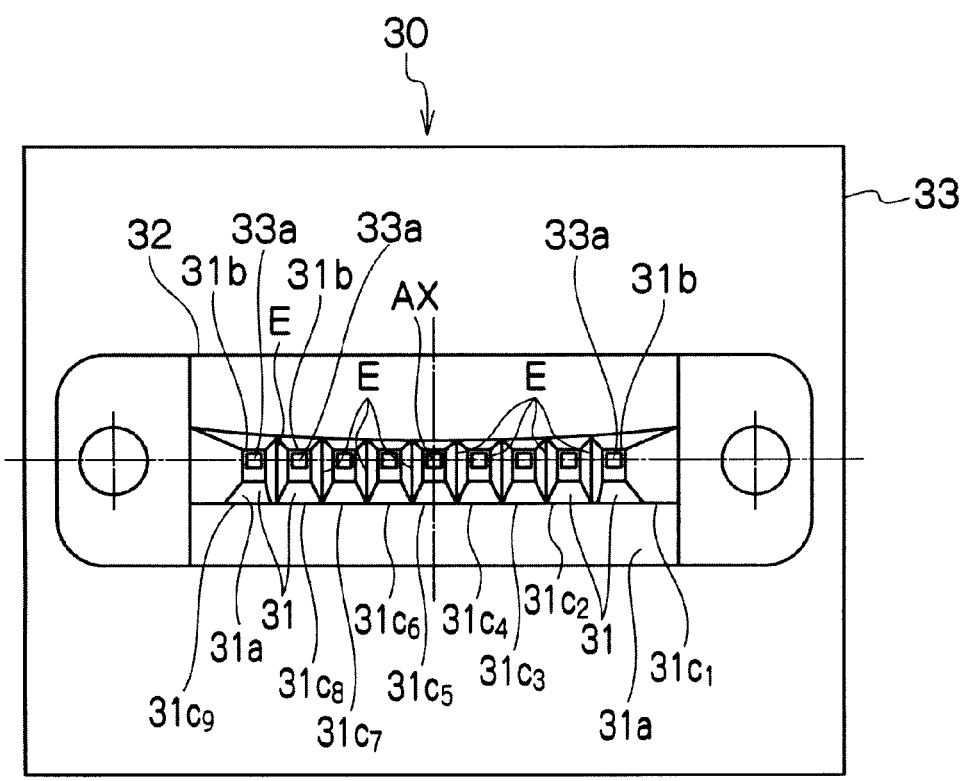
FIG. 14 is a front view of a light source unit with a light guide member in a modified example of a vehicle light made in accordance with principles of the disclosed subject matter.

For example, FIG. 14 is a front view of a light source unit with a light guide member in a modified example wherein the lower edge of the exit openings 31c (including exit openings 31C1 to 31C9) can linearly extend when viewed from its front.

In this modified example, the plurality of illumination areas A1 to A9 on the right side of the front surface of the vehicle body and those on the left side can partly overlap with each other by aiming the vehicle lights (for example, by 1 degree leftward or rightward). This configuration can achieve the individual illumination control at many areas (for example, by 1 degree around the center area).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light having an optical axis extending in a front-to-rear direction of a vehicle body, the vehicle light comprising:
   a projection lens disposed substantially at the optical axis and having a rear-side focal plane; and
   a light source unit disposed behind the rear-side focal plane of the projection lens,
   wherein, the light source unit includes
      a plurality of tubular portions each having a reflective inner peripheral surface, an incoming opening at one end, and an exit opening at an opposing end, and
      a plurality of semiconductor light emitting elements each configured to emit light during operation that enters a corresponding one of the tubular portions through the incoming opening, is reflected by the reflective inner peripheral surface, and exits through the exit opening,
   the exit openings of the plurality of tubular portions are arranged side by side in a substantially horizontal direction behind the rear-side focal plane of the projection lens,
   adjacent ones of the plurality of exit openings of the tubular portions are defined by a common vertical edge while partitioned by the common vertical edge, and
   the plurality of tubular portions each are configured as a tapered cone shape such that the exit opening is wider than the incoming opening.

2. The vehicle light according to claim 1, further comprising a light guide member including the plurality of tubular portions, wherein:
   the plurality of semiconductor light emitting elements each have a light emission surface and are arranged in line in the horizontal direction and are directed so that each light emission surface is directed forward of the vehicle body; and the light guiding member is arranged in front of the plurality of semiconductor light emitting elements so that the light emitted from the plurality of semiconductor light emitting elements enters the plurality of tubular portions through the incoming openings of the tubular portions.

3. The vehicle light according to claim 2, wherein the light guiding member consists of:
a single continuous structure including the tubular portions extending through the structure from a front side to a back side, and a reflective surface located on the tubular portions.

4. The vehicle light according to claim 1, wherein the semiconductor light emitting elements each have a light emission surface and are arranged in a straight line in the horizontal direction and are substantially co-planar with respect to each other.

5. The vehicle light according to claim 1, wherein the semiconductor light emitting elements are light emitting diodes.

6. The vehicle light according to claim 1, further comprising a controller configured to separately adjust power provided to each of the semiconductor light emitting elements such that during operation certain of the semiconductor light emitting elements are driven at a first power different from a second power at which a certain other of the semiconductor light emitting elements are driven.

7. The vehicle light according to claim 6, further comprising a detection device configured to detect an object located within a certain distance from the vehicle body, the detection device connected to the controller such that control of power to the semiconductor light emitting elements is adjusted based on input from the detection device.

8. The vehicle light according to claim 1, wherein each of the tubular portions is substantially rectangular in cross-section taken perpendicular to the optical axis.

9. The vehicle light according to claim 1, wherein the incoming openings are all located along a straight line and within a same plane with respect to each other.

10. The vehicle light according to claim 9, wherein the exit openings are different sizes with respect to each other.

11. A vehicle light having an optical axis extending in a front-to-rear direction of a vehicle body, the vehicle light comprising:
a projection lens disposed substantially at the optical axis and having a rear-side focal plane; and
a light source unit located such that the rear-side focal plane of the projection lens is located between the projection lens and the light source unit,
wherein, the light source unit includes
a plurality of through holes each having a reflective inner surface, an incoming opening at one end, and an exit opening at an opposing end, and
a plurality of semiconductor light emitting elements each located adjacent a respective one of the plurality of through holes and configured to emit light during operation that enters the respective one of the plurality of through holes through the incoming opening, is reflected by the reflective inner surface, and exits through the exit opening,
the exit openings of the plurality of through holes are arranged side by side in a substantially horizontal direction adjacent the rear-side focal plane of the projection lens,
adjacent ones of the plurality of exit openings of the tubular portions are defined by a common vertical edge while partitioned by the common vertical edge, and
the plurality of through holes each are configured as a tapered through hole such that the exit opening to is wider than the incoming opening.

12. The vehicle light according to claim 11, further comprising a light guide member including the plurality of through holes, wherein:
the plurality of semiconductor light emitting elements each have a light emission surface and are arranged in line in the horizontal direction and are directed so that each light emission surface is configured to direct light forward of the vehicle body during operation; and
the light guiding member is arranged in front of the plurality of semiconductor light emitting elements so that the light emitted from the plurality of semiconductor light emitting elements enters the plurality of through holes through the incoming openings of the through holes.

13. The vehicle light according to claim 12, wherein the light guiding member consists of:
a single continuous structure including the through holes extending through the structure from a front side to a back side, and a reflective surface located on the through holes.

14. The vehicle light according to claim 11, wherein the semiconductor light emitting elements each have a light emission surface and are arranged in a straight line in the horizontal direction and are substantially co-planar with respect to each other.

15. The vehicle light according to claim 11, wherein the semiconductor light emitting elements are light emitting diodes.

16. The vehicle light according to claim 11, further comprising a controller configured to separately adjust power provided to each of the semiconductor light emitting elements such that during operation certain of the semiconductor light emitting elements are driven at a first power different from a second power at which a certain other of the semiconductor light emitting elements are driven.

17. The vehicle light according to claim 16, further comprising a detection device configured to detect an object located within a certain distance from the vehicle body, the detection device connected to the controller such that control of power to the semiconductor light emitting elements is adjusted based on input from the detection device.

18. The vehicle light according to claim 11, wherein the incoming openings are all located along a straight line and within a same plane with respect to each other.

19. The vehicle light according to claim 11, wherein the exit openings are different sizes with respect to each other.

* * * * *